(12) United States Patent
Biletskiy (10) Patent No.: US 6,454,355 B2
(45) Date of Patent: Sep. 24, 2002

(54) LATCHING MECHANISM FOR SEAT ASSEMBLY

(75) Inventor: Boris Biletskiy, West Bloomfield, MI (US)

(73) Assignee: Faurecia Automotive Seating Canada Limited, Mississauga (CA)

( * ) Notice: Subject to any disclaimer, the term of this patent is extended or adjusted under 35 U.S.C. 154(b) by 37 days.

(21) Appl. No.: 09/739,712

(22) Filed: Dec. 20, 2000

Related U.S. Application Data
(60) Provisional application No. 60/187,861, filed on Mar. 8, 2000.

(51) Int. Cl.[7] ................................................. B60N 2/02
(52) U.S. Cl. ................................................. 297/378.12
(58) Field of Search ................................ 297/366, 367, 297/365, 368, 369, 378.1, 378.11, 378.12, 378.14, 353, 354.12

(56) References Cited

U.S. PATENT DOCUMENTS

| | | | | |
|---|---|---|---|---|
| 4,165,128 A | * | 8/1979 | Strowick et al. | ............. 297/367 |
| 4,634,182 A | * | 1/1987 | Tanaka | .................... 297/367 X |
| 4,795,213 A | * | 1/1989 | Bell | ................... 297/378.12 X |
| 5,460,429 A | * | 10/1995 | Whalen | ................. 297/378.11 |
| 5,588,705 A | * | 12/1996 | Chang | ........................ 297/367 |
| 6,139,105 A | * | 10/2000 | Morgos et al. | ......... 297/367 X |

* cited by examiner

Primary Examiner—Peter M. Cuomo
Assistant Examiner—Stephen Vu
(74) Attorney, Agent, or Firm—Patrick J. Hofbauer (57) ABSTRACT

A latching mechanism in a vehicle seat hinge assembly having a seatback hinge plate pivotally connected to a seat cushion hinge plate for movement about a hinge pivot axis between substantially upright and forwardly folded positions, comprises a guide and a stop in the seat cushion hinge plate. A link arm member has a follower member slidingly retained by the guide and is pivotally mounted on the seatback hinge plate for movement about a separate and distinct link pivot axis spaced from the hinge pivot axis between two latchable positions whereat the follower member contacts the stop, through an intermediate unlatching position whereat the follower member does not contact the stop. A latch is mounted on the seat cushion hinge plate for selectively holding the follower member in restrained contact with the stop, to thereby retain the seatback hinge plate in either the substantially upright or the forwardly folded position.

17 Claims, 8 Drawing Sheets

LATCHING MECHANISM FOR SEAT ASSEMBLY

This Application claims the benefit of U.S. Provisional Patent Application Ser. No. 60/187,861 filed Mar. 8, 2000.

FIELD OF THE INVENTION

This invention relates to latching mechanisms for use in vehicle seat hinge assemblies, and more particularly to latching mechanisms for use in vehicle seat hinge assemblies wherein the seatback of the vehicle seat can assume a forwardly folded, dumped position.

BACKGROUND OF THE INVENTION

Passenger vehicles, especially combined passenger and utility type vehicles, particularly mini vans, commonly have rear seats (second row and third row) and also perhaps a front row passenger seats, the seatbacks of which each can fold forwardly to a substantially horizontally disposed forwardly folded dumped position, to thereby allow for ingress and egress of passengers to the area behind the folded seats, to facilitate carrying of large or lengthy objects inside the vehicle, and to provide a convenient substantially horizontal flat surface for articles that might be used in a vehicle such as briefcases, laptop computers, food and drinks, and the like.

It is also common in a pickup truck having front and rear seats, for the rear seats to have seat cushion members that tilt upwardly and rearwardly from a substantially horizontal occupiable position to an upright stowed position, thereby to permit the storage of cargo between the front and rear seats when the seat cushion is in its upright stowed position.

Also, it is known to have reclining vehicle seats that have a seatback pivotally mounted on a seat cushion so as to be reclinable from an upright occupiable position to a single predetermined reclined position.

In any of the above discussed vehicle seat arrangements, the vehicle seat typically comprises a pair of vehicle seat hinges, with each vehicle seat hinge having a mounting plate securely attached to a vehicle seat cushion and a sector plate securely attached to a vehicle seatback. Pivotal movement of the seatback member with respect to the seat cushion member is precluded by means of a selectively operable latch that provides a substantially no-chuck latching in each of the two relative angular positions of the seat cushion and the seatback. Commonly, such latches have a manually operable pawl pivotally mounted on the mounting plate for engagement with a cam member also pivotally mounted on the mounting plate. The cam member frictionally engages a first cam surface disposed on the sector plate when the seatback member is in its upright occupiable position and frictionally engages a second cam surface disposed on the sector plate in angularly spaced relation from the first cam surface, when the seatback member is in its forwardly folded position, stowed position, or reclined position, as the application may require. The first and second cam surfaces are spaced apart on the upper sector plate typically by a distance of several inches in order to accommodate the pivoting of the seatback member through an included angle of up to perhaps 120 degrees. Accordingly, a relatively large sector plate is required to provide substantially no-chuck latching in the two positions of maximum angular separation. The use of such large sector plates is highly undesirable as it is difficult to fit them within the limited space envelope allotted in modern vehicle seat hinge designs.

Canadian published Patent Application No. 2,286,048, published Oct. 15, 1998 in the name of Smuk, for a Single Control Handle Release Mechanism For Use With A Vehicle Seat discloses a vehicle seat wherein the seatback folds forwardly over the seat cushion, with the angular position of the seatback with respect to the seat cushion in both the upright position and the forwardly folded dumped position being determined by a stop-pin engaging a curved slot in the rotational control plate. It can be seen that the portion of the rotational control plate that contains the slot is undesirably wide in order to accommodate the curved slot.

In U.S. Pat. No. 6,102,771, issued Jan. 11, 2000 to Shea, for a Seatfold Mechanism, a folding seat assembly has a seat bottom secured to a pivot bracket with the pivot bracket being pivotally mounted on a mounting bracket that is secured to the floor of the vehicle. The seatback is pivotally mounted to the pivot bracket. The seat bottom pivots rearwardly and upwardly from a horizontal occupiable position to an upright stowed position where it contacts the seatback, to permit storage of cargo between the front seat and rear vehicle seats. A doubler plate is engaged by a spring detent mechanism to latch the seat bottom in its seating position and when in its folded upright position. The pivot bracket and the doubler plate are both undesirably large in order to be able to engage the spring detent latching mechanism in both the occupiable and stowed position of the seat cushion member.

It is an object of the present invention to provide a two position latch for use on a vehicle seat hinge.

It is another object of the present invention to provide a two position latch for use on a vehicle seat hinge, which latch is significantly smaller than prior art latches two position latches having similar ability.

It is another object of the present invention to provide a two position latch for use on a vehicle seat hinge, which latch more easily fits into a limited design space.

SUMMARY OF THE INVENTION

In accordance with the present invention there is disclosed a latching mechanism for use in a vehicle seat hinge assembly having a seatback hinge plate mountable on a seatback member and a seat cushion hinge plate mountable on a seat cushion member. The seatback hinge plate is pivotally connected to the seat cushion hinge plate for pivotal movement about a hinge pivot axis between a first angular orientation corresponding to a substantially upright position of the seatback member, and a second angular orientation corresponding to a forwardly folded position of the seatback member. The latching mechanism comprises a guide means disposed in the seat cushion hinge plate and a stop means disposed adjacent the guide means. A link arm member has an elongate axis and a first end, a second end, and a follower member disposed adjacent the second end so as to be engaged in retained sliding relation by the guide means. The link arm member is pivotally mounted adjacent the first end on the seatback hinge plate in spaced relation from the pivot axis for movement about a link pivot axis between a first latchable position corresponding to the first angular orientation and whereat the follower member contacts the stop means, and a second latchable position corresponding to the second angular orientation and whereat the follower member contacts the stop means, and through an intermediate unlatching position corresponding to an intermediate position between the first and second angular orientations and whereat the follower member is removed from contact with the stop means. A latch means is mounted on the seat cushion hinge plate for selectively holding the follower member of the link arm member in restrained contact with the stop means, to thereby retain the seatback hinge plate in either of the first and second angular orientations.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the latching mechanism according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 1:
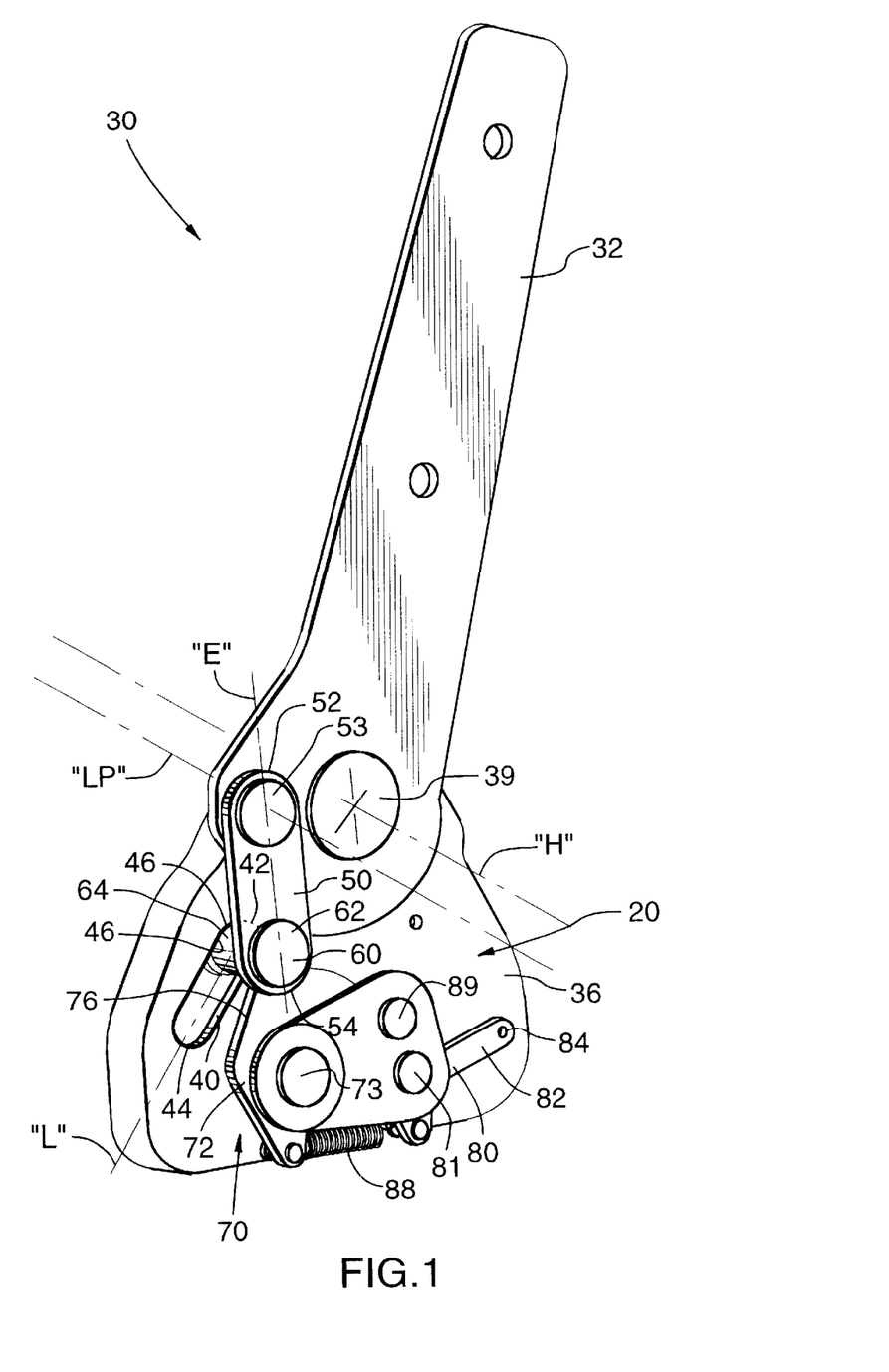
FIG. 1 is a perspective view from the front left of a vehicle seat hinge assembly incorporating a preferred embodiment of the latching mechanism according to present invention.
Figure 2:
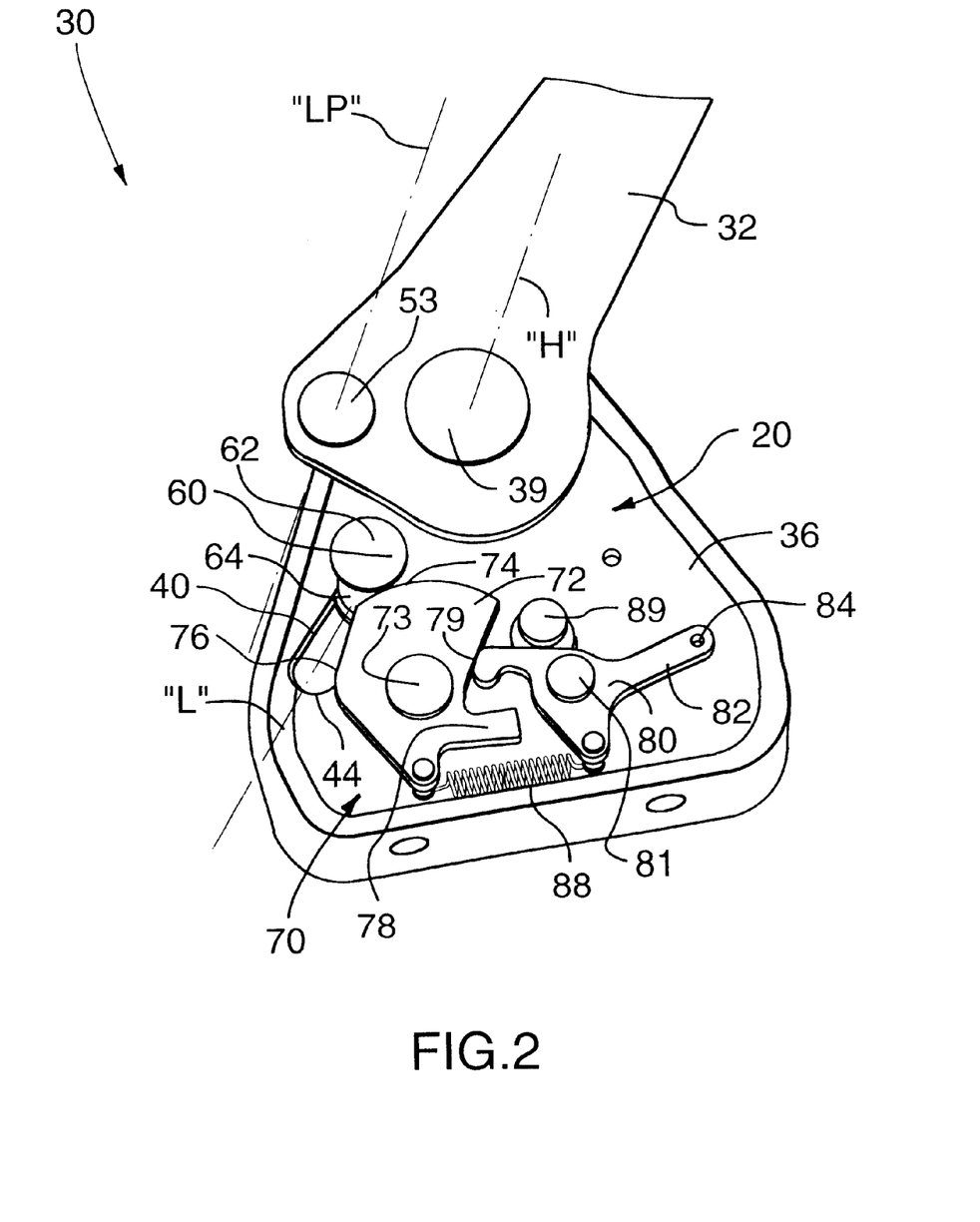
FIG. 2 is an enlarged perspective view from the lower left of a portion of the vehicle seat hinge assembly and latching mechanism of FIG. 1, with a cover plate removed for the sake of clarity.
Figure 3:
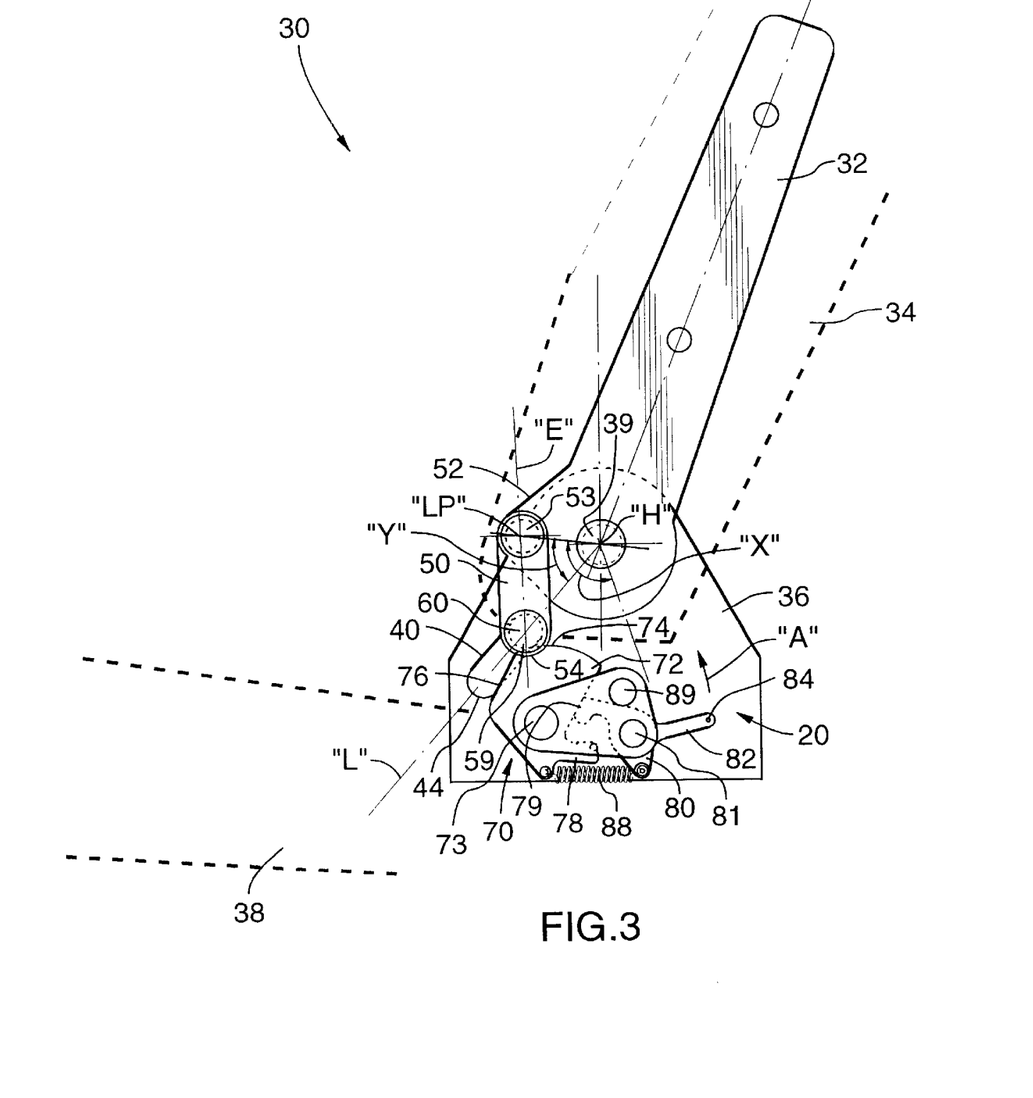
FIG. 3 is a side elevational view of the vehicle seat hinge assembly and latching mechanism of FIG. 1, with the seatback hinge plate in a substantially upright position corresponding to an upright occupiable position of the seatback of a vehicle seat.
Figure 4:
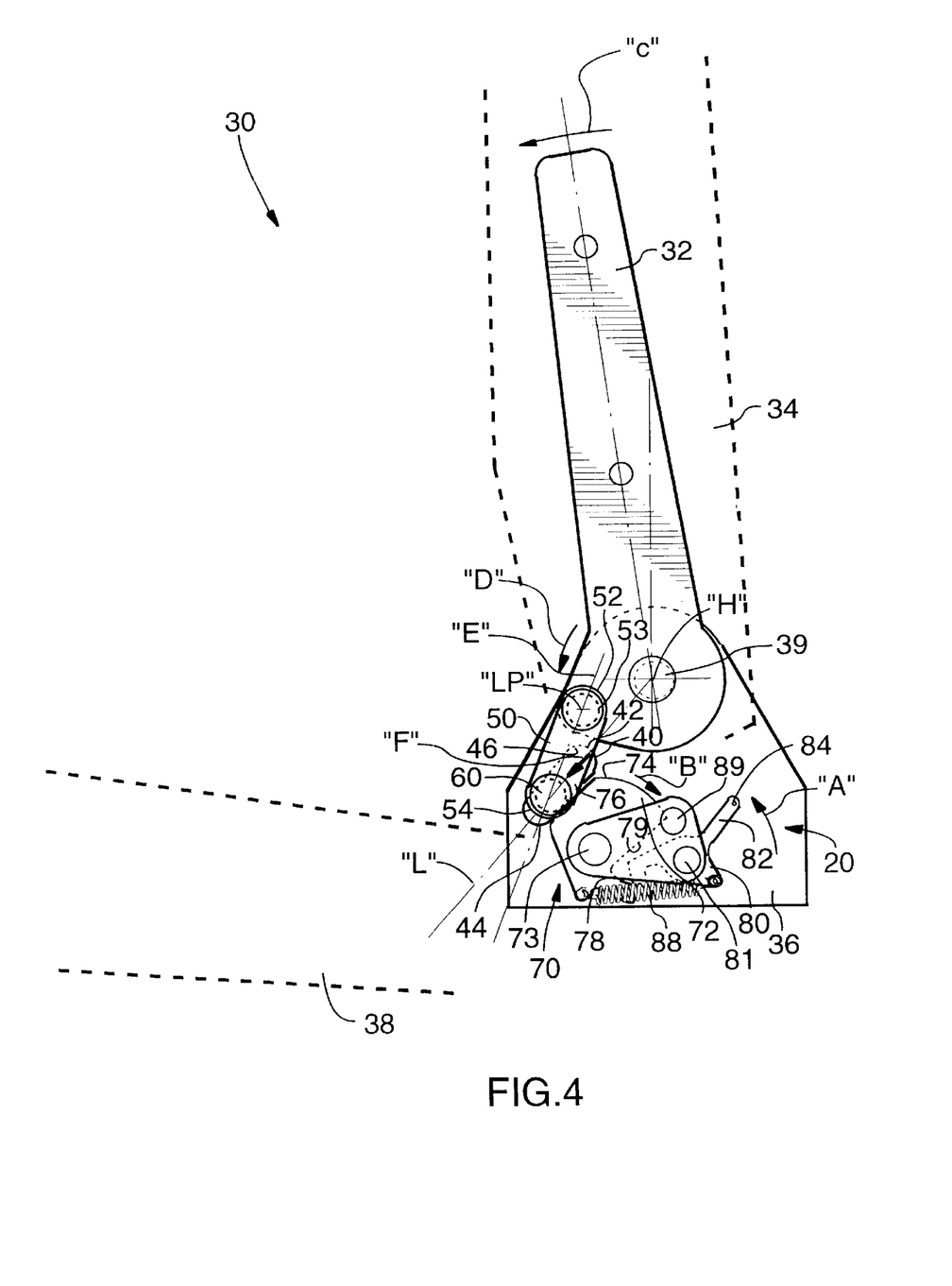
FIG. 4 is a side elevational view similar to FIG. 3, but with the seatback hinge plate having been pivotally moved forwardly from its substantially upright position about one-fourth of the way to a fully forwardly folded position.
Figure 5:
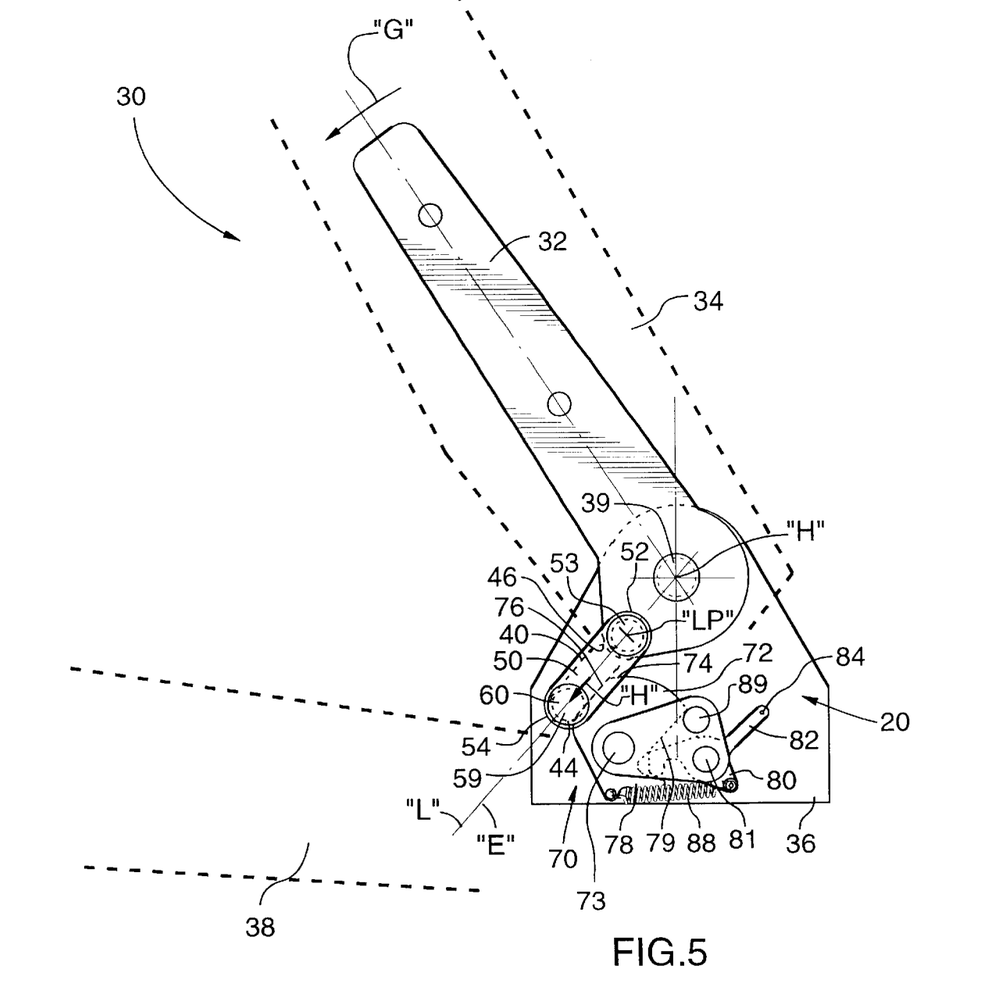
FIG. 5 is a side elevational view similar to FIG. 4, but with the seatback hinge plate having been pivotally moved about halfway to a fully forwardly folded position.
Figure 6:
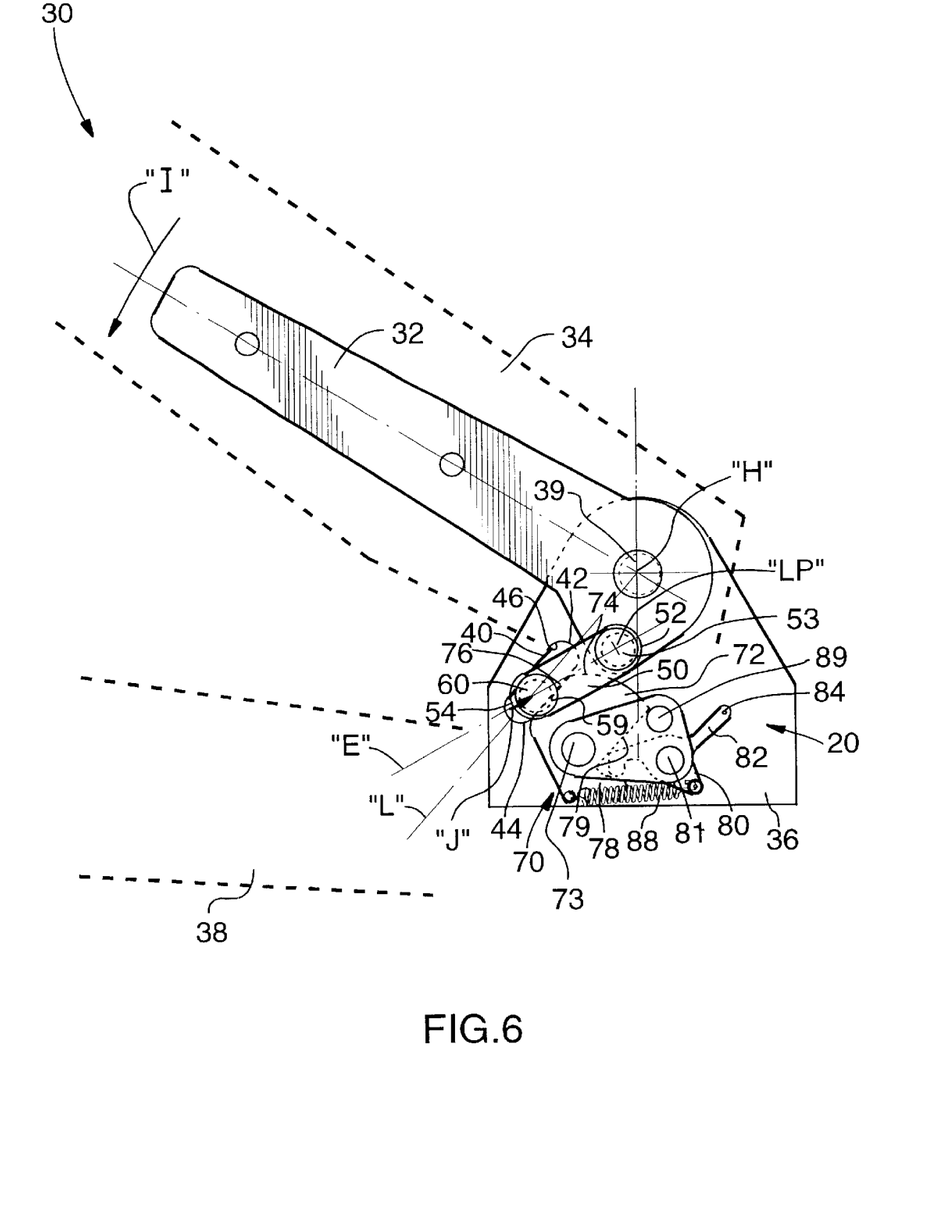
FIG. 6 is a side elevational view similar to FIG. 5, but with the seatback hinge plate having been pivotally moved about three-quarters of the way to a fully forwardly folded position.
Figure 7:
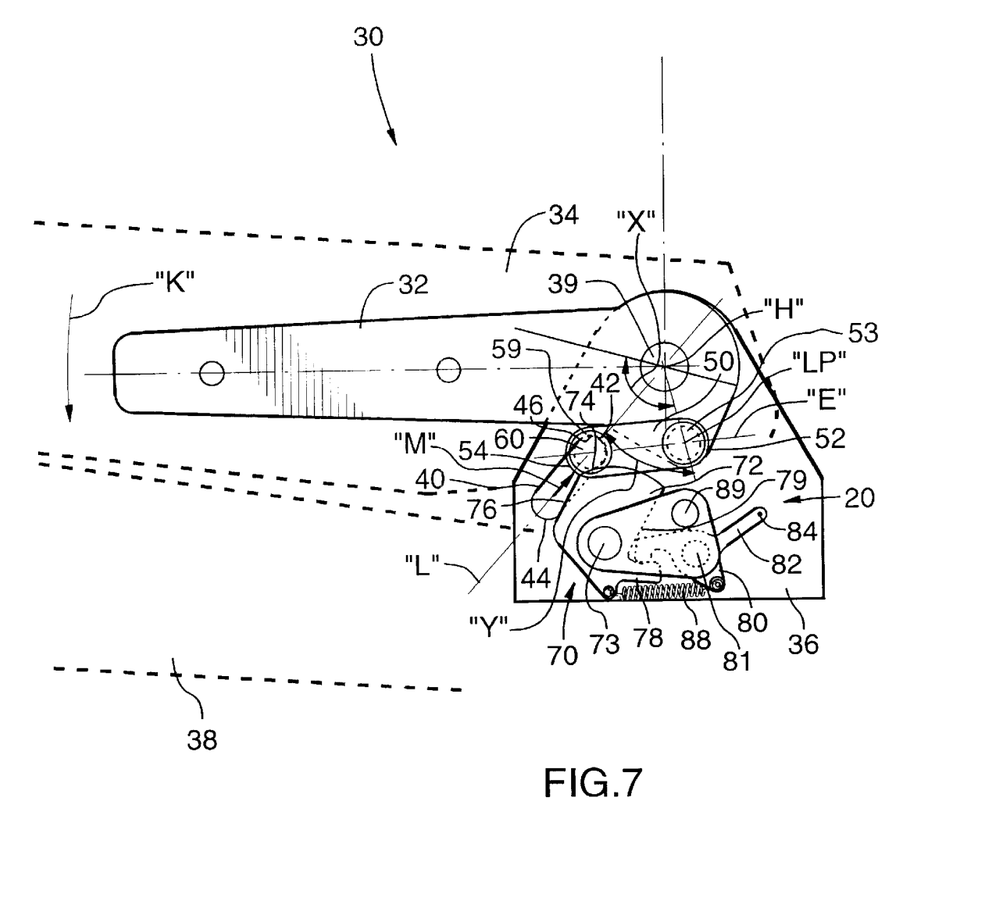
FIG. 7 is a side elevational view similar to FIG. 6, but with the seatback hinge plate having been pivotally moved forwardly to a fully forwardly folded position; and, FIG. 8 is a side elevational view similar to FIG. 7, but with the latching mechanism holding the seatback hinge plate in its fully forwardly folded position.
Figure 8:
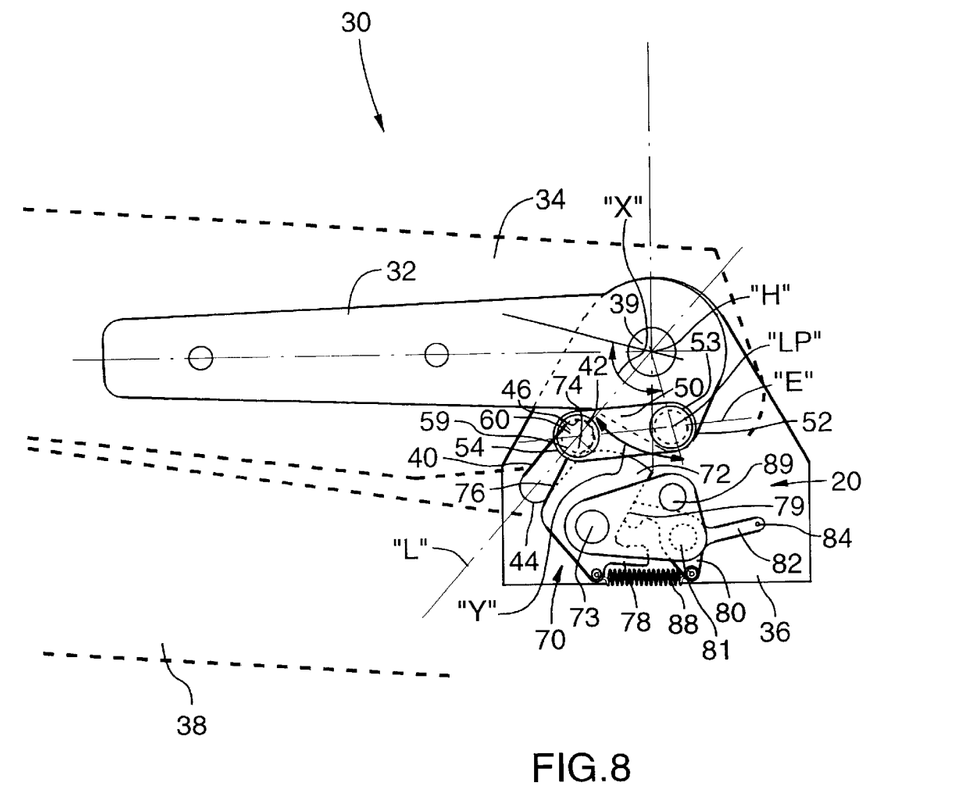

Reference will now be made to FIGS. 1 through 8, which show the latching mechanism, as indicated by the general reference numeral 20, for use in a vehicle seat hinge assembly, as indicated by the general reference numeral 30. The vehicle seat hinge assembly 30 has a seatback hinge plate 32 mountable on a seatback member 34 (shown in ghost outline in FIGS. 3 through 8) and a seat cushion hinge plate 36 mountable on a seat cushion member 38 (also shown in ghost outline in FIGS. 3 through 8). The seatback hinge plate 32 is pivotally connected to the seat cushion hinge plate 36 by a main pivot pin 39, for pivotal movement about a hinge pivot axis "H" between a first angular orientation corresponding to a substantially upright position of the seatback member 34, as can be best seen in FIGS. 1 through 3, and a second angular orientation corresponding to a forwardly folded position of the seatback member 34, as can be best seen in FIG. 8. As indicated by included angle "X" as shown in FIGS. 3, 7, and 8.

The latching mechanism 20 comprises a guide means that in the preferred embodiment illustrated comprises a guide slot 40 disposed in the seat cushion hinge plate 36. The guide slot 40 is oriented so as to have an upper end 42 and a lower end 44, and is substantially straight therebetween, and defines a longitudinal axis "L" extending between the upper end 42 and the lower end 44. In the preferred embodiment illustrated, the upper end 42 of the guide slot 40 is disposed closer to the hinge pivot axis "H" than is the lower end 44 of the guide slot 40, although this is not necessary. Also, the longitudinal axis "L" of the guide slot 40 preferably, but not necessarily, passes through the hinge pivot axis "H".

A stop means is disposed at one end of the guide slot 40, and preferably is adjacent the upper end 42 of the guide slot 40. In the preferred embodiment illustrated, the stop means comprises an upper end surface portion 46 of the guide slot 40. Further, the stop means is disposed at an angle that bisects the angle "X" defined by the first angular orientation, as can be best seen in FIG. 3, and the second angular orientation, as can be best seen in FIGS. 7 and 8. The bisecting of angle "X" is shown by included angles "Y" in FIGS. 3, 7, and 8, which angles "Y" are equal one to the other. In other words, when the seatback hinge plate 32 is in its first angular orientation, as shown in FIG. 3, included angle "Y" is equal to the included angle "Y" as shown in FIGS. 7 and 8, when the seatback hinge plate is in its second angular orientation. Such bisecting of the angle "X" corresponds to the downward travel of the pin member 60 in the guide slot 40 from the upper end surface portion 46 being the same distance of travel as for the return motion of the pin member 60 upwardly along the guide slot 40 to the upper end surface potion 46.

A link arm member 50 having an elongate axis "E", a first end 52, and a second end 54, is pivotally mounted adjacent its first end 52 by a pivot pin 53 on the seatback hinge plate 32 in spaced relation from the hinge pivot axis "H"for movement about a link pivot axis "LP". Such spaced relation of the link pivot axis "LP" from the hinge pivot axis "H" provides for arcuate movement of the link pivot axis "LP" upon pivotal movement of the seatback hinge plate 32 about the hinge pivot axis "H".

A follower member preferably comprises a pin member 60 mounted on the link arm member 50 adjacent the second end 54 thereof. The pin member 60 has a head portion 62 and a shaft portion 64, as is best seen in FIG. 2. The shaft portion 64 extends through a co-operating aperture 59 in the link arm member 50 and preferably extends substantially transversely to the elongate axis "E" of the link arm member 50 so as to be retained in sliding engagement within the guide slot 40.

The link arm member 50 is pivotally mounted for movement about the link pivot axis "LP", as aforesaid, between a first latchable position, as is shown in FIG. 3, and a second latchable position, as is shown in FIG. 8. The first latchable position corresponds to the first angular orientation of the seatback hinge plate 32. In the first latchable position, the pin member 60 contacts the stop means, specifically the upper end surface portion 46 of the guide slot 40. Similarly, in the second latchable position, the pin member 60 contacts the upper end surface portion 46 of the guide slot 40.

The link arm member 50 is also moveable through an intermediate unlatching position, as can be best seen in FIG. 5. In this position, the pin member 60 is removed from contact with the stop means, namely, the upper end surface portion 46 of the guide slot 40 and also is disposed adjacent the lower end 44 of the guide slot 40. It should be noted, however, that the guide slot 40 can be longer, if desired, such that when the link arm member 50 is in its intermediate unlatching position, the pin member 60 is disposed at a distance from the lower end 44 of the guide slot 40. The intermediate unlatching position corresponds to an intermediate angular position of the seatback hinge plate 32, which intermediate angular position is half-way between the first and second angular orientations.

A latch means, as indicated by the general reference numeral 70, comprises a cam member 72 and a pawl member 80.

The cam member 72 is pivotally mounted on the seat cushion hinge plate 36, by means of a pivot pin 73. The cam member 72 is pivotally mounted on the seat cushion hinge plate 36 for latching contact at a cam surface 74 with the pin member 60, when the pin member 60 is in contacting relation with the upper end surface portion 46 of the guide slot 40.

The cam member 72 also comprises an anti-jamming surface 76 disposed thereon so as to be adjacent the guide slot 40. The anti-jamming surface 76 is shaped and positioned on the cam member 72 to contact the pin member 60 as the pin member 60 travels along the guide slot 40, and to permit the cam member 72 to substantially retain its rotational position when the pin member 60 is travelling along the guide slot 40, especially when the pin member 60 is disposed adjacent the lower end 44 of the guide slot 40. In this manner, the cam member 72 does not trap the pin member 60 at the lower end 44 of the guide slot 40. In contrast, if the anti-jamming surface was not shaped properly, the cam member could rotate counter-clockwise, as biased by the biasing spring 88 so as to trap the pin members 60 at the lower end 44 of the guide slot 40.

An actuation arm portion 78 projects in an opposite direction to the cam surface 74 and the anti-jamming surface 76 so as to be operatively engageable by the pawl member 80. Also, a contact surface 79 is disposed between the actuator arm portion 78 and the cam surface 74 so as to be operatively engageable by the pawl member 80.

The pawl member 80 is pivotally mounted on the seat cushion hinge plate 36 by pivot pin 81 for selectively releasable operative engagement with the cam member 72, when the cam member 72 is in latching contact with the pin member 60, specifically with the contact surface 79, thereby to force the cam member 72 into latching contact with the upper end surface portion 46 of the guide slot 40, and with the actuator arm portion 78 to thereby remove the cam member 72 from engagement with the upper end surface portion 46 of the guide slot 40. Further, the pawl member 80 further comprises an actuator handle 82 for permitting manipulation of the pawl member 80.

A cover plate 86 is mounted by pin 73 and pin 81 in partially covering relation over the cam member 72 and the pawl member 80.

The pawl member 80 is spring biased into selectively releaseable operative engagement with the cam member 72 by means of a biasing spring 88 that is operatively interconnected so as to be in tension between the pawl member 80 and the cam member 72. In this manner, the cam member 72 is caused to be spring biased into latching contact with the pin member 60 both indirectly by the pawl member 80, and also directly by means of the biasing spring 88. A stop pin 89 precludes further movement of the pawl member 80.

In the above-described manner, the latch means 60 is mounted on the seat cushion hinge plate 36 for selectively holding the pin member 60 of the link arm member 50 in restrained contact with the stop means, namely the upper end surface portion 46 of the guide slot 40, to thereby retain the seatback hinge plate 32 in either of the first angular orientation, as can be seen in FIG. 3, or the second angular orientation, as can be seen in FIG. 8.

Reference will now be made to FIGS. 3 through 8 to illustrate how, in use, in order to pivotally move the seatback member 34 from its substantially upright occupiable position to its fully forwardly folded cargo carrying position. As can be seen in FIG. 3, the seatback hinge plate 32 is in a first angular orientation corresponding to a substantially upright position of the seatback member 34. As indicated by arrow "A" in FIGS. 3 and 4, the pawl member 80 is rotated against the biasing of the biasing spring 88 by means of a sheathed Bowden type release cable (not shown) connected to the actuator handle 82 of the pawl member 80 through the aperture 84, such that the pawl member 80 is removed from engagement with the contact surface 79 on the cam member 72, to then engage the actuator arm portion 78 of the cam member 72, thus removing the cam member 72 from latching contact with the pin member 60, as indicated by arrow "B", in FIG. 4. As indicated by arrow "C", the seatback hinge plate 32 has started to pivotally move forwardly, thus causing the first end 52 of the link arm member 50 to travel through an arcuate path, as indicated by arrow "D" of FIG. 4. Correspondingly, the pin member 60 disposed adjacent the second end 54 of the link arm member 50 travels downwardly along the guide slot 40, as indicated by arrow "F", towards the lower end 44 on the guide slot 40.

As can be seen in FIG. 5, the seatback hinge plate 32 continues to pivotally move forwardly from its first angular orientation toward its second angular orientation, as indicated by arrow "G". As specifically depicted in FIG. 5, the seatback hinge plate 32 has been pivotally moved through half the included angle from its first angular orientation, as shown in FIG. 3, to its second angular orientation, as shown in FIGS. 7 and 8. Accordingly, the pin member 60 adjacent the second end 54 of the link arm member 50 has reached the lower end 44 of the guide slot 40, as indicated by arrow "H". At this point of forward pivotal movement of the seatback hinge plate 32, the link pivot axis "LP" passes through the longitudinal axis "L" of the guide slot 40.

As can be seen in FIG. 6, the seatback hinge plate 32 continues to pivotally move forwardly from its first angular orientation toward its second angular orientation, as indicated by arrow "I". Correspondingly, the linked arm member is now pulled by the seatback hinge plate 32 such that the pin member 60 disposed adjacent the second end 54 of the link arm member 50 is moved upwardly away from the lower end 44 of the guide slot 40, as indicated by arrow "J", toward the upper end 42 of the guide slot 40.

As indicated by arrow "K" in FIGS. 7 and 8, the seatback hinge plate 32 continues to be pivotally moved until its reaches its second angular orientation, corresponding to the forwardly folding position of the seatback member 34. Correspondingly, the pin member 60 disposed adjacent the second end 54 of a link arm member 50 is pulled upwardly along the guide slot 40 to the upper end 42 of the guide slot 40, as indicated by arrow "M" whereat the pin member 60 contacts the stop means, namely the upper end surface portion 46 of the guide slot 40. Once the pin member 60 has reached this position, the biasing spring 88 causes the cam member 72 to return to the position whereat it selectively holds the pin member 60 of the link arm member 50 in restrained contact with the upper end surface portion 46 of the guide slot 40, to thereby retain the seatback hinge plate 32 in its second angular orientation. Also, the biasing spring 88 causes the pawl member 80 to be in operative engagement with the cam member 72, so as to keep the cam member 72 selectively holding the pin member 60.

Other modifications and alterations may be used in the design and manufacture of the latching mechanism 20 according to the present invention without departing from the spirit and scope of the invention, which is limited only by the accompanying claims.

I claim:

1. A latching mechanism for use in a vehicle seat hinge assembly having a seatback hinge plate mountable on a seatback member and a seat cushion hinge plate mountable on a seat cushion member, wherein said seatback hinge plate is pivotally connected to said seat cushion hinge plate for pivotal movement about a hinge pivot axis between a first angular orientation corresponding to a substantially upright position of said seatback member, and a second angular orientation corresponding to a forwardly folded position of said seatback member, said latching mechanism comprising:

a guide means disposed in said seat cushion hinge plate;

a stop means disposed adjacent said guide means;

a link arm member having an elongate axis and a first end, a second end, and a follower member disposed adjacent said second end so as to be engaged in retained sliding relation by said guide means, said link arm member being pivotally mounted adjacent said first end on said seatback hinge plate for movement about a separate and distinct link pivot axis spaced from said hinge pivot axis between a first latchable position corresponding to said first angular orientation and whereat said follower member contacts said stop means, and a second latchable position corresponding to said second angular orientation and whereat said follower member contacts said stop means, and through an intermediate unlatching position corresponding to an intermediate position between said first and second angular orientations and whereat said follower member is removed from contact with said stop means; and, a latch means mounted on said seat cushion hinge plate for selectively holding said follower member of said link arm member in restrained contact with said stop means, to thereby retain said seatback hinge plate in either of said first and second angular orientations.

2. The latching mechanism of claim 1, wherein said stop means is disposed at an included angle that bisects said first angular orientation and said second angular orientation.

3. The latching mechanism of claim 2, wherein said follower member extends substantially transversely to the elongate axis of said link arm member.

4. The latching mechanism of claim 3, wherein said guide means comprises a guide slot.

5. The latching mechanism of claim 4, wherein said guide slot is oriented to have an upper end and a lower end.

6. The latching mechanism of claim 5, wherein said stop means is disposed adjacent said upper end of said guide slot.

7. The latching mechanism of claim 6, wherein said stop means comprises an upper end surface portion of said guide slot.

8. The latching mechanism of claim 7, wherein said upper end of said guide slot is disposed closer to said hinge pivot axis than said lower end of said guide slot.

9. The latching mechanism of claim 8, wherein said guide slot is substantially straight and defines a longitudinal axis extending between said upper end portion and said lower end.

10. The latching mechanism of claim 9, wherein said follower member of said link arm member comprises a pin member mounted on said link arm member for sliding engagement within said guide slot.

11. The latching mechanism of said claim 10, wherein said longitudinal axis of said guide slot passes through said hinge pivot axis.

12. The latching mechanism of said claim 11, wherein said latch means comprises a cam member pivotally mounted on said seat cushion hinge plate for latching contact with said pin member when said pin member is in contacting relation with said stop means, and a pawl member pivotally mounted on said seat cushion hinge plate for selectively releasable operative engagement with said cam member.

13. The latching mechanism of said claim 12, wherein said pawl member is spring biased into said selectively releasable operative engagement with said cam member by means of a biasing spring, thereby causing said cam member to be spring biased into said latching contact with said pin member.

14. The latching mechanism of said claim 13, wherein said biasing spring is operatively interconnected between said pawl member and said cam member.

15. The latching mechanism of said claim 14, wherein said biasing spring also directly biases said cam member into said latching contact with said pin member.

16. The latching mechanism of said claim 15, further comprising an anti-jamming surface on said cam member, wherein said anti-jamming surface is disposed adjacent said guide slot and is shaped and positioned to contact said pin member, as said pin member travels along said guide slot.

17. The latching mechanism of said claim 16, further comprising an actuator handle mounted on said pawl member for permitting manipulation of said pawl member.

* * * * *